United States Patent
Yu et al.

(10) Patent No.: US 10,029,612 B1
(45) Date of Patent: Jul. 24, 2018

(54) LAMP FOR VEHICLE AND METHOD OF CONTROLLING THE SAME

(71) Applicant: SL Corporation, Daegu (KR)

(72) Inventors: Eun Sang Yu, Gyeongsangbuk-do (KR); Ji Young Yang, Gyeongsangbuk-do (KR); Dae Kyu Kim, Gyeongsangbuk-do (KR); Ki Yang Park, Gyeongsangbuk-do (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 15/461,832

(22) Filed: Mar. 17, 2017

(51) Int. Cl.
*B60Q 1/02* (2006.01)
*B60Q 1/34* (2006.01)
*B60Q 1/00* (2006.01)
*B60Q 1/26* (2006.01)
*B60Q 1/14* (2006.01)

(52) U.S. Cl.
CPC ............ *B60Q 1/34* (2013.01); *B60Q 1/0023* (2013.01); *B60Q 1/1461* (2013.01); *B60Q 1/2665* (2013.01); *B60Q 2400/00* (2013.01)

(58) Field of Classification Search
CPC ............ H05B 33/0815; H05B 33/0827; H05B 33/0845; B60C 1/1461; B60C 11/002; B60C 2300/146
USPC ..................................................... 315/77, 82
See application file for complete search history.

(56) References Cited

U.S. PATENT DOCUMENTS

| | | | |
|---|---|---|---|
| 7,010,401 B1* | 3/2006 | Richburg | G05D 1/0225 180/167 |
| 2004/0080273 A1* | 4/2004 | Ito | H05B 33/0815 315/77 |
| 2010/0141162 A1* | 6/2010 | Matsumoto | H05B 33/0818 315/186 |
| 2013/0127612 A1* | 5/2013 | Stadler | B60Q 1/34 340/465 |
| 2015/0381030 A1* | 12/2015 | Endo | H02H 9/08 363/50 |
| 2016/0249432 A1* | 8/2016 | Zhang | G09G 3/3406 |

FOREIGN PATENT DOCUMENTS

| KR | 10-2011-0076483 A | 7/2011 |
|---|---|---|
| KR | 10-2014-0088626 A | 7/2014 |

* cited by examiner

*Primary Examiner* — Tung X Le
(74) *Attorney, Agent, or Firm* — Mintz Levin Cohn Ferris Glovsky and Popeo, P.C.; Kongsik Kim; Jhongwoo Peck

(57) ABSTRACT

The present disclosure provides a lamp for a vehicle and a method of controlling the same. The vehicle lamp intuitively informs a traveling direction of the vehicle and minimizes deterioration of visibility when a failure occurs and a method of controlling the same. A lamp for a vehicle includes a light source unit having a plurality of light source groups and an operation state detection unit configured to detect an operation state of at least one light source included in each of the plurality of light source groups. A lighting mode determination unit is configured to determine a lighting mode of the light source unit based on the detected operation state. A control unit is configured to operate the light source unit in any one of a first lighting mode and a second lighting mode based on the determined lighting mode.

11 Claims, 9 Drawing Sheets

LAMP FOR VEHICLE AND METHOD OF CONTROLLING THE SAME

BACKGROUND

(a) Field of the Disclosure

The present invention relates to a lamp for a vehicle and a method of controlling the same and more particularly, to a vehicle lamp capable of more intuitively informing a traveling direction of the vehicle and preventing deterioration of visibility when a failure occurs and a method of controlling the same.

(b) Description of the Related Art

Generally, a vehicle includes various lamps having an illumination function for easily identifying an object positioned around the vehicle when the vehicle is driven during low light conditions and a signaling function for informing drivers of nearby vehicles or pedestrians of a driving state of the vehicle. For example, a head lamp, a fog lamp and the like are used primarily for illumination purpose, and a turn signal lamp, a back-up lamp, a brake lamp and the like are primarily used for signaling purpose. These lamps for vehicles have installation standards and specifications prescribed by laws and regulations to fully exert the respective functions.

For example, the turn signal lamp is installed on both sides of the front or rear of the vehicle, and flickers when the vehicle changes its driving lane or turns left or right at an intersection or the like to inform a nearby vehicle driver or pedestrian of a traveling direction of the vehicle. Accordingly, the nearby vehicle drivers or pedestrian are altered to the vehicles intention and prepare for this in advance. The turn signal lamp corresponding to the traveling direction of the vehicle flickers based on the operation of the driver or the driving state of the vehicle, thereby informing a nearby vehicle driver or pedestrian of the traveling direction of the vehicle.

However, when the turn signal lamp simply flickers, the nearby vehicle driver or pedestrian must recognize not only a flickering operation of the turn signal lamp but also the position of the turning signal lamp in the flickering state to know the intended traveling direction of the vehicle. Accordingly, it is difficult to intuitively recognize the traveling direction of the vehicle. Therefore, there is a demand for a method of improving the visibility and enabling a nearby vehicle driver or pedestrian to more intuitively recognize the traveling direction of the vehicle when the turn signal lamp of the vehicle is operated.

The above information disclosed in this section is merely for enhancement of understanding of the background of the disclosure and therefore it may contain information that does not form the prior art that is already known in this country to a person of ordinary skill in the art.

SUMMARY

The present disclosure provides a lamp for a vehicle to enable a nearby vehicle driver or pedestrian to more intuitively recognize a traveling direction of the vehicle by dispersing light along the traveling direction of the vehicle and a method of controlling the same. The present disclosure provides a lamp for a vehicle that prevents deterioration of visibility due to a malfunction when a failure occurs and a method of controlling the same.

According to an aspect of the present disclosure, a lamp for a vehicle may include a light source unit having a plurality of light source groups; an operation state detection unit configured to detect an operation state of at least one light source included in each of the plurality of light source groups; a lighting mode determination unit configured to determine a lighting mode of the light source unit based on the detected operation state; and a control unit configured to operate the light source unit in any one of a first lighting mode and a second lighting mode based on the determined lighting mode.

According to another aspect of the present disclosure a method of controlling a lamp for a vehicle may include operating a plurality of light source groups, each including at least one light source, in a first lighting mode; determining whether a failure has occurred in the at least one light source; and operating the plurality of light source groups in a second lighting mode when a failure occurs in the at least one light source.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION

Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some embodiments, well-known steps, structures and techniques will not be described in detail to avoid obscuring the disclosure. The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the disclosure are described herein with reference to plan and cross-section illustrations that are schematic illustrations of idealized embodiments of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. In the drawings, respective components may be enlarged or reduced in size for convenience of explanation. Throughout the specification, like reference numerals in the drawings denote like elements.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Figure 1:
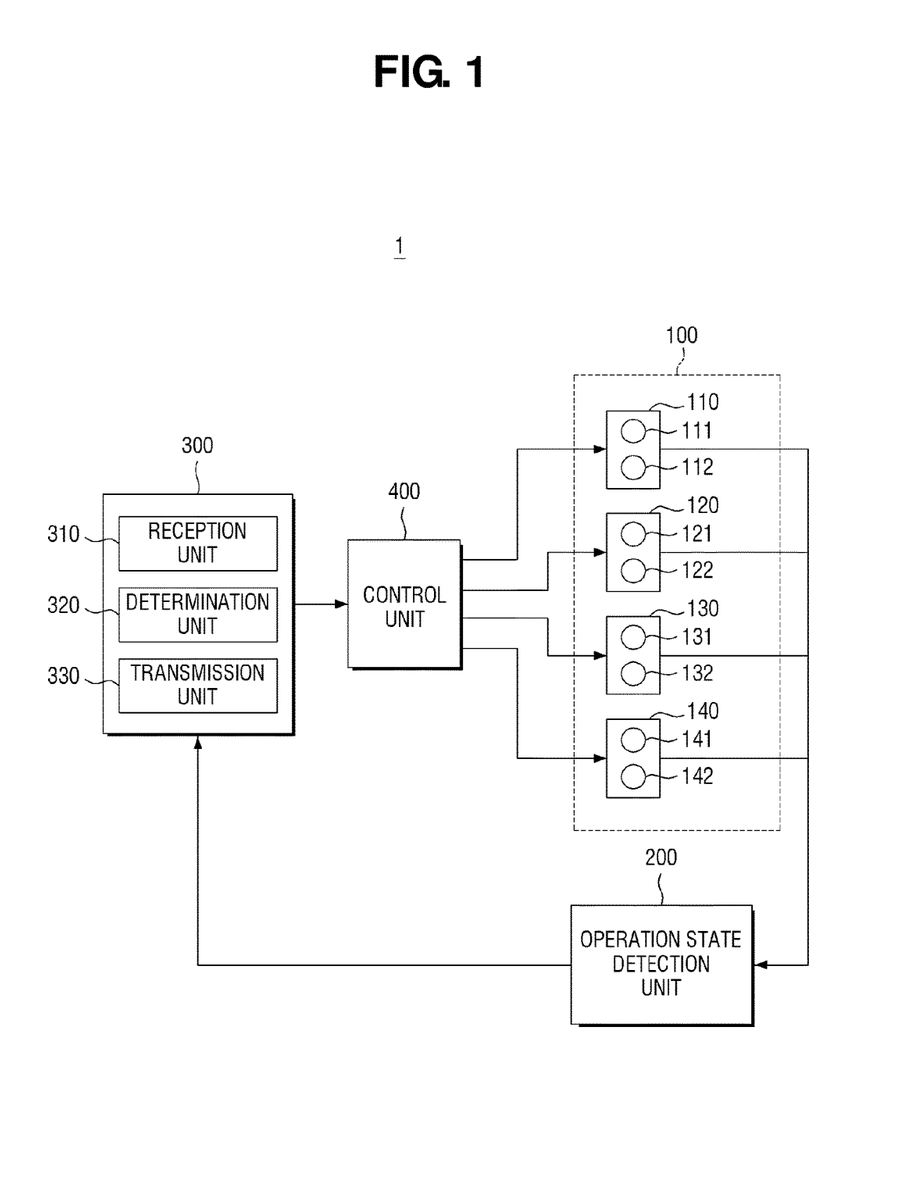
FIG. 1 is an exemplary block diagram showing a lamp for a vehicle according to an exemplary embodiment of the present disclosure.

Hereinafter, a lamp for a vehicle and a method of controlling the same according to an exemplary embodiment of the present disclosure will be described with reference to the accompanying drawings. FIG. 1 is an exemplary block diagram that shows a lamp for a vehicle according to an embodiment of the present disclosure. Referring to FIG. 1, a vehicle lamp 1 according to an exemplary embodiment of the present disclosure may include a light source unit 100, an operation state detection unit 200, a lighting mode determination unit 300, and a control unit 400. In the exemplary embodiment of the present disclosure, when the vehicle lamp 1 is a turn signal lamp may inform a nearby vehicle driver or pedestrian of a traveling direction of the vehicle when the vehicle changes its driving lane or turns left or right at an intersection or the like.

Figure 2:
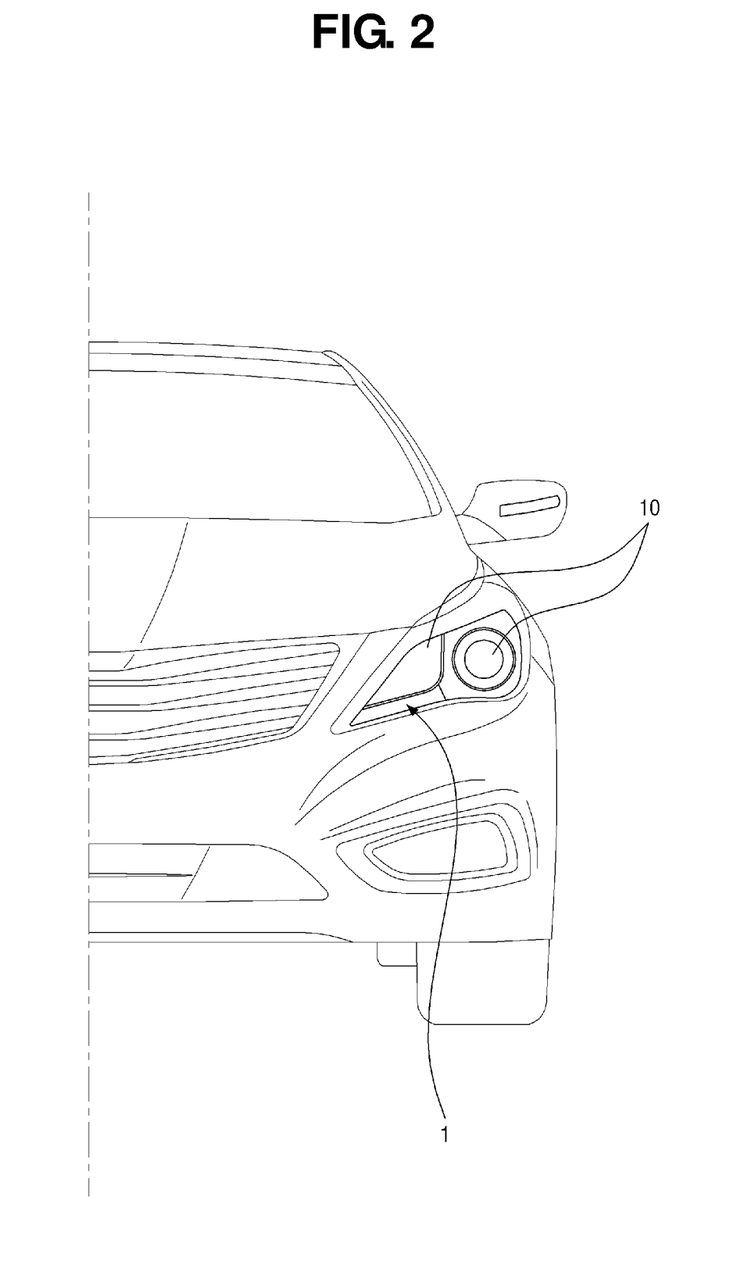
FIGS. 2 to 4 are exemplary schematic views showing a vehicle in which a vehicle lamp according to an exemplary embodiment of the present disclosure is installed.
Figure 3:
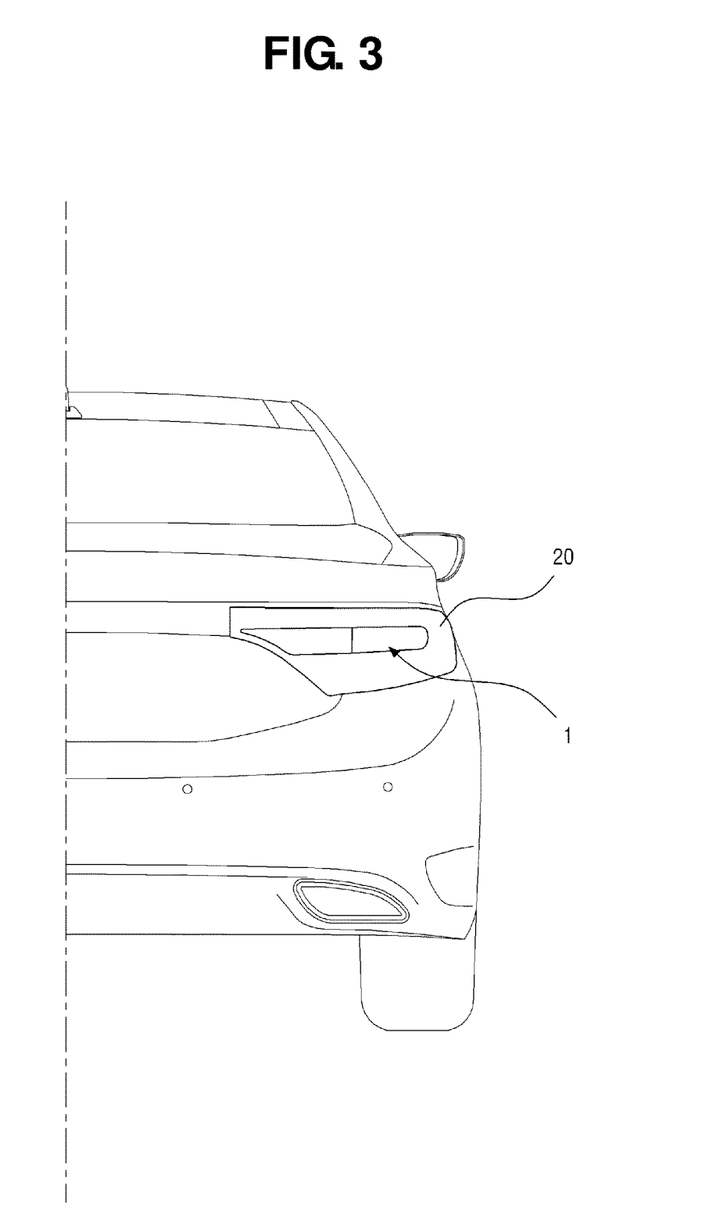
Figure 4:
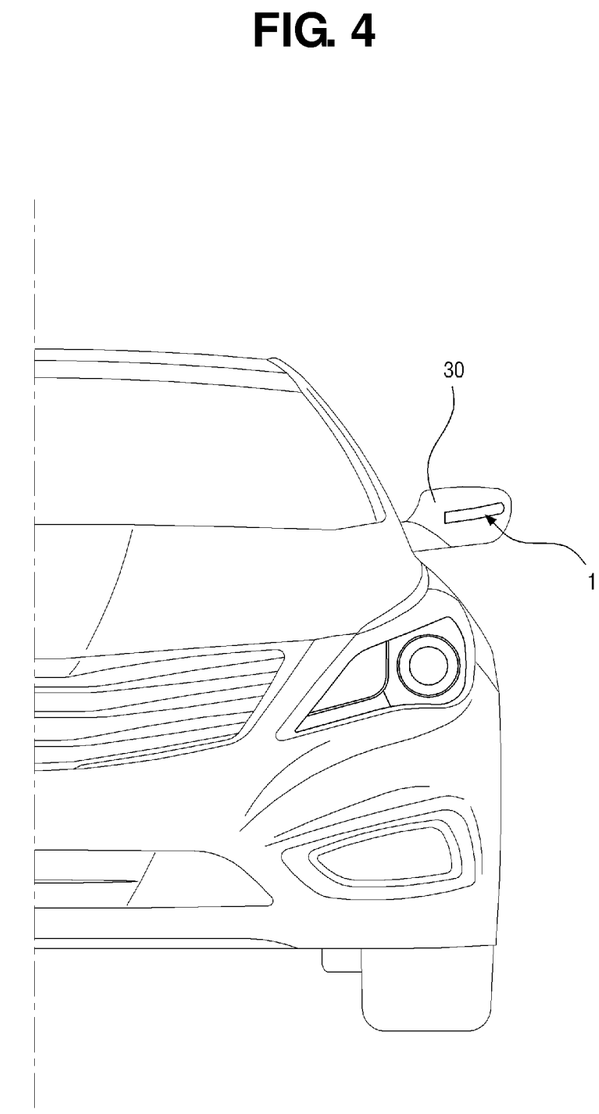

Further, in the exemplary embodiment of the present disclosure, the vehicle lamp 1 may be disposed proximate to a head lamp 10 of the vehicle as shown in FIG. 2, or may be disposed proximate to a rear lamp 20 of the vehicle as shown in FIG. 3, or may be disposed on an exterior mirror 30 of the vehicle as shown in FIG. 4. However, it is merely an example to facilitate the understanding of the present disclosure, and the present disclosure is not limited thereto. For example, the vehicle lamp 1 may be disposed in at least one position that enables a nearby vehicle driver or pedestrian to more easily recognize the traveling direction of the vehicle. The light source unit 100 may include a plurality of light source groups 110 to 140 arranged in a predetermined direction. Additionally each of the light source group 110 to 140 may include at least one light source.

Hereinafter, in the exemplary embodiment of the present disclosure, the plurality of light source groups 110 to 140 are referred to as a first light source group 110, a second light source group 120, a third light source group 130, and a fourth light source group 140, respectively. Additionally, the plurality of light source group 110 to 140 may include a plurality of light sources 111, 112, 121, 122, 131, 132, 141 and 142, respectively, which will be described as an example. However, it is merely an example to facilitate the understanding of the present disclosure, and the present disclosure is not limited thereto. The number of light source groups may vary and each light source group may include at least one light source.

Further, in the exemplary embodiment of the present disclosure, the plurality of light source groups 110 to 140 may be arranged in a horizontal direction. However, the present disclosure is not limited thereto. The plurality of light source groups 110 to 140 may be arranged in at least one direction depending on the layout of the vehicle lamp 1 and the like.

The light source unit 100 may be configured to operate in various lighting modes. For example, in the light source unit 100, the plurality of light source groups 110 to 140 may be turned on sequentially or simultaneously. Hereinafter, in the exemplary embodiment of the present disclosure, a sequential lighting mode in which the plurality of light source groups 110 to 140 are turned on sequentially is referred to as a first lighting mode. A simultaneous lighting mode in which the plurality of light source groups 110 to 140 are turned on simultaneously is referred to as a second lighting mode.

Figure 5:
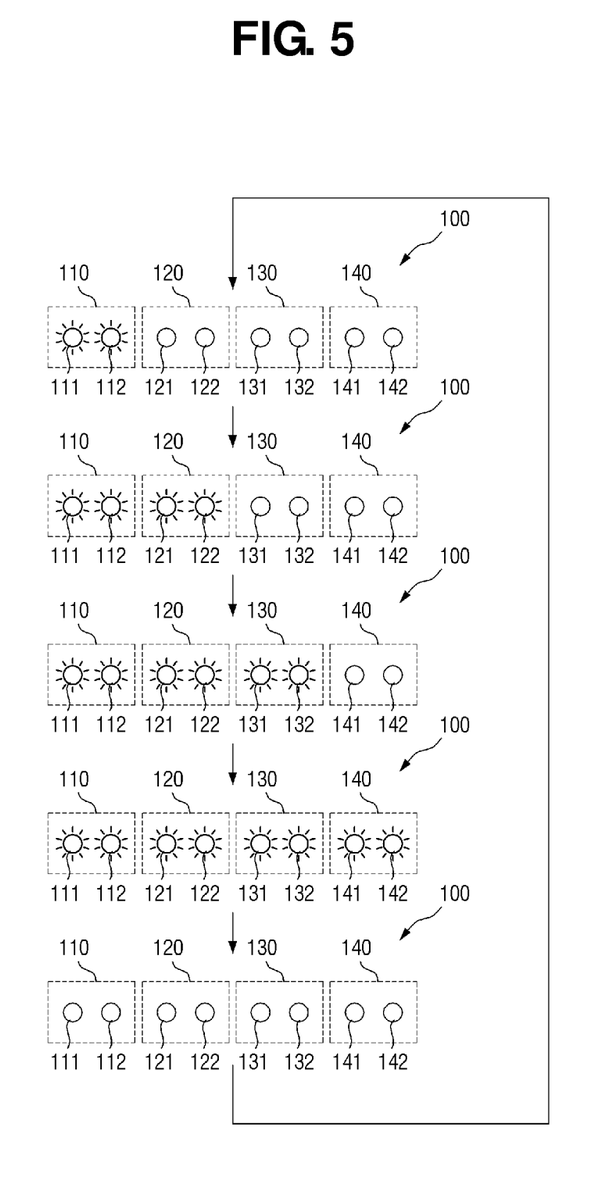
FIG. 5 is an exemplary schematic diagram illustrating a first lighting mode according to an exemplary embodiment of the present disclosure.
Figure 6:
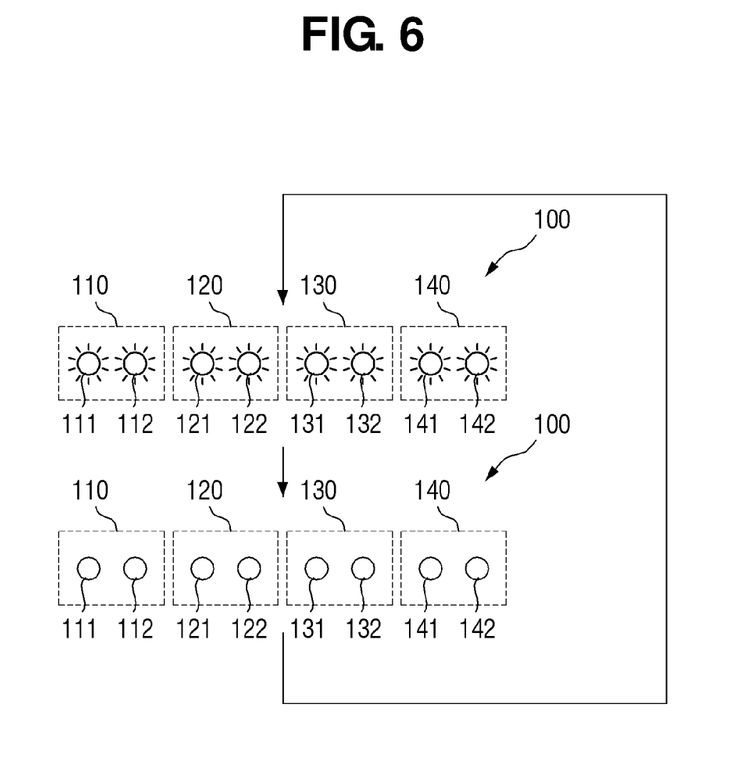
FIG. 6 is an exemplary schematic diagram illustrating a second lighting mode according to an exemplary embodiment of the present disclosure.

Since the vehicle lamp 1 in the exemplary embodiment of the present disclosure is a turn signal lamp that indicates the traveling direction of the vehicle, the light source unit 100 may be turned on and off periodically based on an operation signal. In the sequential lighting mode, as shown in FIG. 5, a process may be repeated in which the light source groups 110 to 140 are turned on sequentially and maintained in the ON state in an ON period of an operation cycle. The light source groups 110 to 140 may be turned off simultaneously in an OFF period of the operation cycle. In the simultaneous lighting mode, as shown in FIG. 6, a process may be repeated in which all the light source groups 110 to 140 are turned on simultaneously and maintained in the ON state in an ON period of an operation cycle. The light source groups 110 to 140 may be turned off simultaneously in an OFF period of the operation cycle.

The sequential lighting mode as shown in FIG. 5 may disperse light along the traveling direction of the vehicle. Accordingly, a driver of a proximate vehicles or a pedestrian may more intuitively recognize the traveling direction of the vehicle. For example, when the plurality of light source groups 110 to 140 are arranged in an outward direction from the interior of the vehicle and the first light source group 110 to the fourth light source group 140 are turned on sequentially, the light may be dispersed along the traveling direction of the vehicle, thereby making it possible to intuitively recognize the traveling direction of the vehicle.

The operation state detection unit 200 may be configured to detect the operation state of the plurality of light sources 111, 112, 121, 122, 131, 132, 141 and 142 included in the plurality of light source groups 110 to 140, and may be configured to generate a state signal that provides an indication of the detected operation state. For example, the operation state detection unit 200 may be configured to detect the operation state by measuring a voltage between a plurality of terminals provided for power supply or operation control in the plurality of light sources 111, 112, 121, 122, 131, 132, 141 and 142, respectively. A state signal may be generated that indicates the detected operation state. The operation state detection unit 200 may be configured to generate a first state signal when all of the light sources 111, 112, 121, 122, 131, 132, 141 and 142 operate normally, and may be configured to generate a second state signal when a failure is detected such as a short circuit or disconnection in at least one of the light sources 111, 112, 121, 122, 131, 132, 141 and 142.

The lighting mode determination unit 300 may be configured to generate a lighting control signal for controlling the lighting mode of the light source unit 100 based on the state signal generated by the operation state detection unit 200, and transmit the generated lighting control signal to the control unit 400. The lighting mode determination unit 300 may include a reception unit 310 for receiving a state signal from the operation state detection unit 200, a determination unit 320 for determining the lighting mode of the light source unit 100 based on the received state signal and generating a lighting control signal indicating the determined lighting mode, and a transmission unit 330 for transmitting the generated lighting control signal to the control unit 400. The reception unit 310 may be configured to receive the state signal generated by the operation state detection unit 200 based on the operation states of the plurality of light sources 111, 112, 121, 122, 131, 132, 141 and 142. The reception unit 310 may be configured to receive the first state signal or the second state signal described above.

The determination unit 320 may be configured to determine the lighting mode of the light source unit 100 based on the received state signal and generate a different lighting control signal based on the determined lighting mode. For example, when the first state signal is received by the reception unit 310, the determination unit 320 may determine that the light sources 111, 112, 121, 122, 131, 132, 141 and 142 operate normally, and select the first lighting mode as the lighting mode of the light source unit 100. When the second state signal is received by the reception unit 310, the determination unit 320 may determine that a failure has occurred in at least one of the light sources 111, 112, 121, 122, 131, 132, 141 and 142, and select the second lighting mode as the lighting mode of the light source unit 100. Further, the determination unit 320 may be configured to generate a first lighting control signal when the first lighting mode is selected, and generate a second lighting control signal when the second lighting mode is selected.

The transmission unit 330 may be configured to transmit the lighting control signal generated by the determination unit 320 to the control unit 400. The control unit 400 may be configured to operate the light source unit 100 in the lighting mode based on the lighting control signal transmitted from the lighting mode determination unit 300. When receiving the first lighting control signal from the lighting mode determination unit 300, the control unit 400 may be configured to operate the light source unit 100 in the sequential lighting mode (e.g., first lighting mode).

Figure 7:
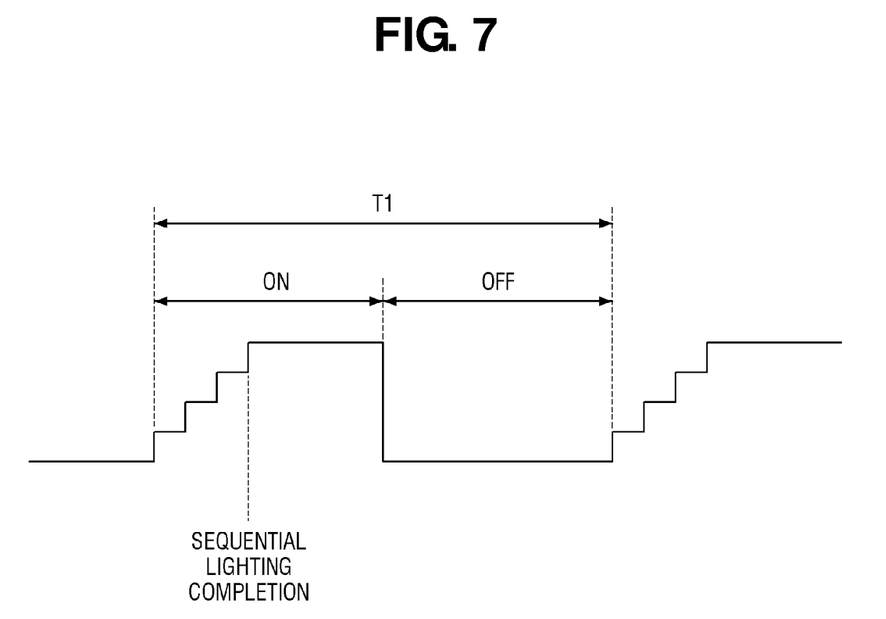
FIG. 7 is an exemplary schematic diagram showing an operation signal of the first lighting mode according to the exemplary embodiment of the present disclosure.

When the light source unit 100 is operated in the first lighting mode, (e.g., in the sequential lighting mode), as shown in FIG. 7, the control unit 400 may be configured to generate an operation signal to control an ON period of an operation cycle T1, to sequentially turn on the light source groups 110 to 140 and maintained in the ON state until the ON period ends from when the sequential lighting is completed (e.g., when all of the light source groups 110 to 140 are turned on), and in an OFF period of the operation cycle T1, to simultaneously turn off the light source groups 110 to 140.

In the exemplary embodiment of the present disclosure, in the first lighting mode, the time taken from the lighting start of the plurality of light source groups 110 to 140 to the completion of the sequential lighting may be in the range of about 170 to 190 ms. When the time duration until the sequential lighting of the plurality of light source groups 110 to 140 is completed is less than 170 ms, the lighting may be distracting due to a short cycle in which the plurality of light source groups 110 to 140 are turned on sequentially which may dazzle a driver or pedestrian proximate to the vehicle. When the time duration until the sequential lighting of the plurality of light source groups 110 to 140 is completed is greater than 190 ms, a lighting interval between the light source groups becomes long, and a sufficient signal effect is difficult to achieve.

In the exemplary embodiment of the present disclosure, when the first lighting mode includes the time duration until the sequential lighting of the plurality of light source groups 110 to 140 is completed is about 175 ms, and each of the ON period and the OFF period is about 375 ms will be described as an example. However, the time duration until the sequential lighting of the plurality of light source groups 110 to 140 is completed may be adjusted between 170 and 190 ms as described above.

Figure 8:
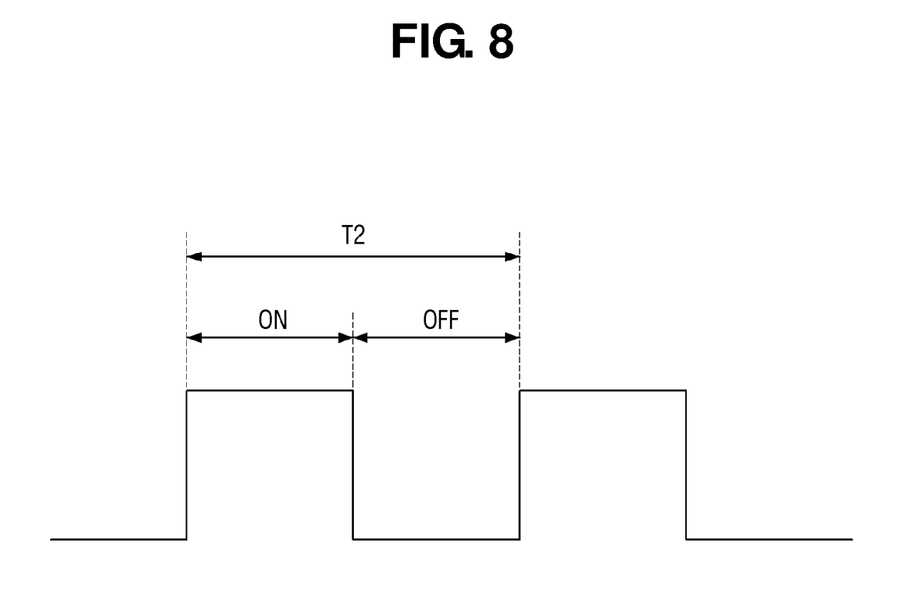
FIG. 8 is an exemplary schematic diagram showing an operation signal of the second lighting mode according to the exemplary embodiment of the present disclosure.

Further, when receiving the second lighting control signal from the lighting mode determination unit 300, the control unit 400 may be configured to operate the light source unit 100 in the simultaneous lighting mode that is the second lighting mode. When the light source unit 100 is operated in the second lighting mode, (e.g., in the simultaneous lighting mode), as shown in FIG. 8, the control unit 400 may be configured to generate an operation signal for controlling such that in an ON period of an operation cycle T2, the light source groups 110 to 140 are simultaneously turned on and maintained in the ON state until the ON period ends, and in an OFF period of the operation cycle T2, the light source groups 110 to 140 are simultaneously turned off.

Further, in the exemplary embodiment of the present disclosure, a case where each of the ON period and the OFF period of the second lighting mode is about 200 ms will be described as an example. In the exemplary embodiment of the present disclosure, when a failure occurs in at least one of the light sources 111, 112, 121, 122, 131, 132, 141 and 142, the lighting mode of the light source unit 100 may be adjusted from the first lighting mode to the second lighting mode. Since the operation cycle T2 of the second lighting mode is less than the operation cycle T1 of the first lighting mode, the light source unit 100 may be turned on and off at a greater rate of the operation cycle when a failure occurs in at least one of the light sources 111, 112, 121, 122, 131, 132, 141 and 142 as compared with the case where all of the light sources 111, 112, 121, 122, 131, 132, 141 and 142 operate normally. Thus, it is possible to more quickly recognize and accommodate the occurrence of a failure in at least one of the plurality of light sources 111, 112, 121, 122, 131, 132, 141 and 142 included in the light source unit 100.

Meanwhile, in the exemplary embodiment of the present disclosure, it is possible to prevent a malfunction of operating in the first lighting mode although a failure has occurred substantially in at least one of the plurality of light sources 111, 112, 121, 122, 131, 132, 141 and 142 when the time taken from the detecting the operation state to determining the lighting mode exceeds the ON period of the second lighting mode.

The control unit 400 may be configured to control the light source unit 100 at the time when the operation of the light source unit 100 is requested. The request for operation of the light source unit 100 may be performed based on a rotation angle of a steering wheel or wheels of the vehicle, an operation signal of a turn signal operation lever, and the like. Further, the control unit 400 may be configured to operate the light source unit 100 based on a preset lighting mode at the time when the operation of the light source unit 100 is requested. The preset lighting mode may be determined based on an initial voltage level of the operation signal of the control unit 400. For example, when an initial lighting mode is the sequential lighting mode, the control unit 400 may be configured to generate an operation signal having a high level for a predetermined time period. When the initial lighting mode is the simultaneous lighting mode, the control unit 400 may be configured to generate an operation signal having a low level for a predetermined time period.

The vehicle lamp 1 according to the exemplary embodiment of the present disclosure as described above may adjust the lighting mode of the light source unit 100 from the first lighting mode to the second lighting mode when a failure occurs in at least one of the light sources 111, 112, 121, 122, 131, 132, 141 and 142 included in the plurality of light source groups 110 to 140. However, the present disclosure is not limited thereto, and the light source unit 100 may be adjusted from the first lighting mode to the second lighting mode by an operation of the driver (e.g., using a button or switch provided in the vehicle). Further, at least a part of the components 100, 200, 300 and 400 of the vehicle lamp 1 according to the exemplary embodiment of the present disclosure may be embedded in a junction box or smart junction box including various components such as a fuse, a relay and the like configured to transmit power and control signals to various components of the vehicle such as a lamp, a heater, a wiper and an air conditioner.

Figure 9:
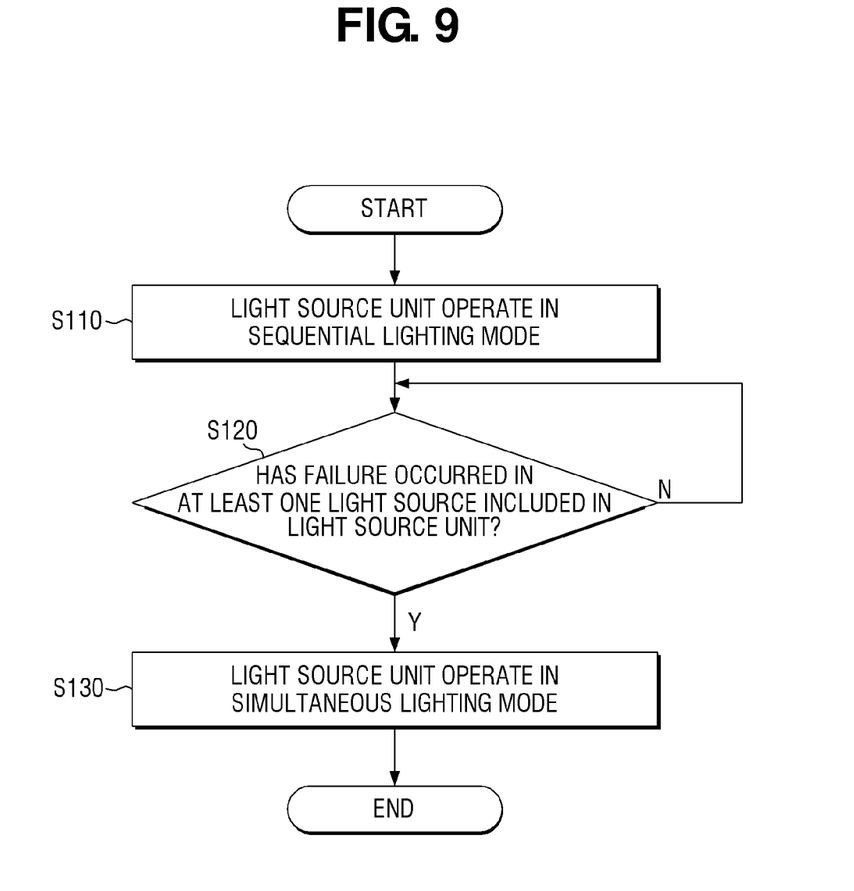
FIG. 9 is an exemplary flowchart showing a method of controlling a vehicle lamp according to an exemplary embodiment of the present disclosure.

FIG. 9 is an exemplary flowchart showing a method of controlling a vehicle lamp according to an exemplary embodiment of the present disclosure. FIG. 9 shows an example in which the lighting mode may be adjusted when the light source unit 100 is operated in the sequential lighting mode while all of the light sources 111, 112, 121, 122, 131, 132, 141 and 142 included in the light source unit 100 operate normally. Referring to FIG. 9, the plurality of light source groups 110 to 140 are initially operated in the sequential lighting mode (S110). Although FIG. 9 illustrates an example in which the plurality of light source groups 110 to 140 are initially operated in the sequential lighting mode, the present disclosure is not limited thereto. The plurality of light source groups 110 to 140 may be initially operated in the simultaneous lighting mode.

It is determined whether a failure has occurred in at least one of the plurality of light sources 111, 112, 121, 122, 131, 132, 141 and 142 included in the plurality of light source groups 110 to 140 (S120). In the exemplary embodiment of the present disclosure, the failure of the plurality of light sources 111, 112, 121, 122, 131, 132, 141 and 142 may be determined by measuring a voltage for each light source. When a failure occurs in at least one of the plurality of light sources 111, 112, 121, 122, 131, 132, 141 and 142, the lighting mode of the light source unit 100 may be adjusted to the simultaneous lighting mode (S130). When the lighting mode of the light source unit 100 is adjusted from the sequential lighting mode to the simultaneous lighting mode, the ON/OFF period may be reduced.

Embodiments of the present disclosure provide at least the following effects. By spreading light along the traveling direction of the vehicle, the visibility can be improved because a nearby vehicle driver or pedestrian can intuitively recognize the traveling direction of the vehicle. Further, by changing the lighting mode in the event of a failure, it is possible to prevent deterioration of visibility due to a malfunction and promptly cope with the failure. The effects of the present disclosure are not limited to the above-described effects and other effects which are not described herein will become apparent to those skilled in the art from the following description.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims. Therefore, it should be understood that the above exemplary embodiments are only exemplary, but are not limited. The scope of the present disclosure is represented by the scope of the accompanying claims, rather than the detailed description. All changes or modifications derived from the meaning and scope of the claims and equivalent concepts thereof should be interpreted as being included in the scope of the present disclosure.

DESCRIPTIONS OF REFERENCE NUMERALS

100: light source unit
110-140: light source groups
111, 112, 121, 122, 131, 132, 141, 142: light sources
200: operation state detection unit
300: lighting mode determination unit
310: reception unit
320: determination unit
330: transmission unit
400: control unit

The invention claimed is:
1. A lamp for a vehicle, comprising:
a light source unit including a plurality of light source groups;
an operation state detection unit configured to detect an operation state of at least one light source included in each of the plurality of light source groups;
a lighting mode determination unit configured to determine a lighting mode of the light source unit based on the detected operation state; and
a control unit configured to operate the light source unit in a first lighting mode or a second lighting mode based on a lighting control signal transmitted from the lighting mode determination unit,
wherein the first lighting mode is a sequential lighting mode having the plurality of light source groups that are turned on sequentially, and the second lighting mode is a simultaneous lighting mode having the plurality of light source groups that are turned on simultaneously, and
wherein when a failure is detected while the light source unit operates in the first lighting mode, the lighting mode determination unit is configured to determine the lighting mode of the light source unit as the second lighting mode indicating an occurrence of the failure.

2. The lamp of claim 1, wherein the first lighting mode includes a time duration of about 170 to 190 ms until the sequential lighting of the plurality of light source groups is completed.

3. The lamp of claim 1, wherein the operation state detection unit is configured to detect a failure occurring in the at least one light source, and generates a state signal based on the detection result, and wherein the lighting mode determination unit is configured to determine the lighting mode of the light source unit based on the state signal.

4. The lamp of claim 3, wherein the operation state detection unit is configured to detect a short circuit or disconnection that occurs in the at least one light source.

5. The lamp of claim 3, further comprising:

a reception unit configured to receive the state signal;

a determination unit configured to determine the lighting mode based on the state signal and generate the lighting control signal based on the determined lighting mode; and a transmission unit configured to transmit the lighting control signal to the control unit.

6. The lamp of claim 5, wherein the determination unit is configured to select the second lighting mode as the lighting mode of the light source unit when a failure occurs in the at least one light source.

7. The lamp of claim 1, wherein the control unit is configured to operate the light source unit initially in any one of the first lighting mode and the second lighting mode, and operates the light source unit in the second lighting mode when a failure occurs in the at least one light source.

8. The lamp of claim 1, wherein the control unit is configured to turn the light source unit on and off at an operation cycle having an ON period and an OFF period, and the second lighting mode has an operation cycle that is less than the first lighting mode.

9. A method of controlling a lamp for a vehicle, comprising:

operating a plurality of light source groups, each including at least one light source, in a first lighting mode;

determining whether a failure has occurred in the at least one light source; operating the plurality of light source groups in a second lighting mode when a failure occurs in the at least one light source, wherein the first lighting mode is a sequential lighting mode in which the plurality of light source groups are turned on sequentially, and the second lighting mode is a simultaneous lighting mode in which the plurality of light source groups are turned on simultaneously;

determining whether a failure occurs in the at least one light source while the plurality of light source groups operate in the first lighting mode; and operating the plurality of light source groups in the second lighting mode indicating an occurrence of the failure when a failure occurs in the at least one light source.

10. The method of claim 9, wherein the determining whether a failure has occurred includes detecting a short circuit or disconnection that occurs in the at least one light source.

11. The method of claim 9, wherein the operating the plurality of light source groups in the second lighting mode includes operating the plurality of light source groups in the second lighting mode having an operation cycle less than the first lighting mode.

\* \* \* \* \*